UNITED STATES PATENT OFFICE.

BIRD E. NEWELL, OF WATSON, MINNESOTA.

SOLDER.

1,357,297.  Specification of Letters Patent.  Patented Nov. 2, 1920.

No Drawing.  Application filed November 8, 1919.  Serial No. 336,694.

*To all whom it may concern:*

Be it known that I, BIRD E. NEWELL, a subject of the King of Great Britain, residing at Watson, in the county of Chippewa and State of Minnesota, have invented certain new and useful Improvements in Solder; and I do hereby declare the following to be a full, clear, and exact description of the invention, such as will enable others skilled in the art to which it appertains to make and use the same.

My invention provides an improved solder for soldering together various different kinds of metal.

The solder is made of the following ingredients:

Ammonia muriate, borax, (powdered), mercury, block tin, and lead.

These metals have, in practice, been alloyed together in approximately the following proportions, to wit:

| | |
|---|---|
| Ammonia muriate (granular) | ½ oz. |
| Borax, powdered | 1 oz. |
| Mercury | 2½ oz. |
| Block tin | 10 oz. |
| Lead | 13 oz. |

These proportions make the best product for general purposes that I have, so far, been able to produce, and is what I commercially use. The amounts of the several different materials of the alloy or solder above given will produce one and one-half pounds of solder, but, of course, the amounts may be greatly varied, as well as the proportion.

The process by which I produce this alloy solder is, as follows:

First, I melt together the lead and the block tin, and thereafter add the borax. Instead of adding all of the borax at one time, I preferably divide the same into about three equal parts and mix the same into the molten lead and tin at different times, skimming off impurities after each addition of borax.

Next, to the molten mixture of lead, tin and borax, I add the mercury and thoroughly mix the same in. The next step consists in adding and stirring in the sal ammoniac, and continuing the stirring thereof, until the fumes from the molten mixture cease to rise. The solder alloy is then run into suitable molds and cooled.

This alloy solder I have found to be remarkably efficient for soldering together all kinds of metal. It has even been used and found very efficient for soldering together the broken sections of tempered saw blades, which is about the hardest test that solder can be put to.

What I claim is:

1. A solder alloy compound of ammonia muriate, borax, mercury, tin and lead.

2. A solder alloy compound of ammonia muriate, borax, mercury, tin and lead, in approximately the following proportions:

| | |
|---|---|
| Ammonia muriate | ½ oz. |
| Borax | 1 oz. |
| Mercury | 2½ oz. |
| Block tin | 10 oz. |
| Lead | 13 oz. |

In testimony whereof I affix my signature in presence of two witnesses.

BIRD E. NEWELL.

Witnesses:
S. E. GILKEY,
J. E. ODDAN.